(12) United States Patent
Kim et al.

(10) Patent No.: US 10,811,149 B2
(45) Date of Patent: Oct. 20, 2020

(54) PASSIVE NATURAL CIRCULATION COOLING SYSTEM AND METHOD

(71) Applicants: Kihwan Kim, Daejeon (KR); Taesoon Kwon, Daejeon (KR); Sungwon Bae, Daejeon (KR)

(72) Inventors: Kihwan Kim, Daejeon (KR); Taesoon Kwon, Daejeon (KR); Sungwon Bae, Daejeon (KR)

(73) Assignee: KOREA ATOMIC ENERGY RESEARCH INSTITUTE, Daejeon (KR)

(*) Notice: Subject to any disclaimer, the term of this patent is extended or adjusted under 35 U.S.C. 154(b) by 204 days.

(21) Appl. No.: 15/573,857

(22) PCT Filed: May 10, 2016

(86) PCT No.: PCT/KR2016/004854
§ 371 (c)(1),
(2) Date: Nov. 14, 2017

(87) PCT Pub. No.: WO2016/190572
PCT Pub. Date: Dec. 1, 2016

(65) Prior Publication Data
US 2018/0261342 A1    Sep. 13, 2018

(30) Foreign Application Priority Data
May 27, 2015  (KR) .................. 10-2015-0074212

(51) Int. Cl.
*G21C 15/18* (2006.01)
*G21C 15/16* (2006.01)
*G21C 13/02* (2006.01)

(52) U.S. Cl.
CPC ............. *G21C 15/18* (2013.01); *G21C 15/16* (2013.01); *G21C 13/02* (2013.01); *Y02E 30/40* (2013.01)

(58) Field of Classification Search
CPC ....................................................... G21C 15/18
See application file for complete search history.

(56) References Cited

U.S. PATENT DOCUMENTS 4,816,209 A * 3/1989 Schweiger ........... G21C 19/303
                                                     376/309
5,478,419 A * 12/1995 Dumas ..................... C21D 1/34
                                                     148/672

(Continued)

FOREIGN PATENT DOCUMENTS

CN      204151185 U     2/2015
JP      H06242279 A     9/1994

(Continued)

OTHER PUBLICATIONS

Official Action dated Dec. 18, 2018 received from the Chinese Patent Office in related application CN 201680029720.8.

(Continued)

*Primary Examiner* — Lily C Garner
(74) *Attorney, Agent, or Firm* — Scully Scott Murphy and Presser

(57) ABSTRACT

A passive natural circulation cooling system according to the present invention can comprise: a passive condensation tank formed to accommodate cooling water; and a condensate water recirculation device provided at the inner part or upper part of the passive condensation tank, and condensing the cooling water such that the cooling water circulates inside the passive condensation tank. The condense water recirculation device can include: a duct extending upwards from the upper part of the passive condensation tank; and a plurality (Continued)

of partition plates provided inside the passive condensation tank or the duct.

20 Claims, 20 Drawing Sheets

(56) References Cited

U.S. PATENT DOCUMENTS

| | | | | |
|---|---|---|---|---|
| 2016/0042820 A1* | 2/2016 | Sprague | ............... | G21C 1/084 |
| | | | | 376/260 |
| 2018/0218796 A1* | 8/2018 | Kwon | ................. | G21C 15/18 |

FOREIGN PATENT DOCUMENTS

| | | | | |
|---|---|---|---|---|
| JP | 2004020376 | A | * | 1/2004 |
| JP | 2004020376 | A | | 1/2004 |
| JP | 2013076578 | A | | 4/2013 |
| KR | 101221814 | B1 | * | 1/2013 |
| KR | 101221814 | B1 | | 1/2013 |
| KR | 101459550 | B1 | * | 11/2014 |
| KR | 101459550 | B1 | | 11/2014 |
| RU | 2099801 | C1 | | 12/1997 |
| RU | 2496163 | C2 | | 10/2013 |

OTHER PUBLICATIONS

IAEA-TECDOC-1624, Passive Safety Systems and Natural Circulation in Water Cooled Nuclear Power Plants, IAEA, 2009.
International Search Report dated Aug. 10, 2016 issued in PCT/KR2016/004854.
Courtesy Office Action issued in corresponding Russian Patent Appln. No. 2017142959, dated Aug. 30, 2018.

* cited by examiner

PASSIVE NATURAL CIRCULATION COOLING SYSTEM AND METHOD

CROSS-REFERENCE TO RELATED APPLICATIONS

This application is the National Stage filing under 35 U.S.C. 371 of International Application No. PCT/KR2016/004854, filed on May 10, 2016, which claims the benefit of earlier filing date and right of priority to Korean Application No. 10-2015-0074212, filed on May 27, 2015, the contents of which are all hereby incorporated by reference herein in their entirety.

TECHNICAL FIELD

The present invention relates to a passive natural circulation cooling system provided in a passive condensation tank and a cooling method using the same.

BACKGROUND ART

Passive condensation tanks are used as heat sinks to remove heat of a reactor (sensible heat of the reactor and residual heat of a reactor core) upon an occurrence of accidents in various reactors including an integral reactor. The heat of the reactor is finally transferred to a passive condensation tank through a passive auxiliary feed water system. Accordingly, cooling water in the passive condensation tank evaporates and heat is discharged to the atmosphere.

A heat exchanger in the passive auxiliary feed water system is a water-cooling type (SMART reactor in Korea, AP1000 of Westinghouse in USA), an air-cooling type (SCOR in France) or a hybrid-cooling (IMR in Japan) with the water-cooling and the air-cooling in a mixed manner.

A cooling method of the heat exchanger is understood with reference to Reference Document 1.

[Reference Document 1] IAEA-TECDOC-1624, Passive Safety Systems and Natural Circulation in Water Cooled Nuclear Power Plants, IAEA, 2009

Generally, the water-cooled heat exchanger is advantageous in reducing a capacity of the heat exchanger by virtue of its excellent cooling efficiency. However, cooling water inside the passive condensation tank which receives heat from the heat exchanger is gradually evaporated and eventually exhausted upon an occurrence of an accident. Therefore, the cooling water of the passive condensation tank should be periodically refilled for long-term cooling exceeding the cooling water storage capacity.

On the other hand, the air-cooled heat exchanger is advantageous in that a periodic refill of the cooling water is not required because there is no passive condensation tank, but cooling efficiency of the air-cooled heat exchanger is lower than that of the water-cooled heat exchanger. The efficiency of the air-cooled heat exchanger depends on heat transfer efficiency of a wall surface of a tube with which air is brought into contact. Since heat transfer efficiency of the air-cooled heat exchanger is lowered while transferring heat to outside (external air) through the wall surface of the tube, size and number of the heat exchanger should increase.

In addition, heat transfer performance of the hybrid-cooling type heat exchanger is drastically reduced at the time of operating in the air-cooling manner, as compared with that in the water-cooling manner, and thereby a relatively large heat exchanger must be used instead of the water-cooled heat exchanger.

For cooling the inside of the heat exchanger of the passive auxiliary feed water system, a steam condensation type condensation heat exchanger having excellent heat transfer efficiency is widely employed. Since the heat exchanger of the passive auxiliary feed water system generally operates at high temperature and high pressure, design pressure is very high. Thus, stability must be further considered. When the size of the heat exchanger is increased, economical efficiency is drastically lowered.

Heat transferred from the reactor upon an occurrence of an accident of the reactor is not always constant. Unlike general boilers, the nuclear reactor generates residual heat in a core for a considerable period of time after the reactor core is shut down. Accordingly, when the reactor is shut down due to an accident or the like, a large amount of residual heat is discharged from the core in the early stage of the accident, and the discharged residual heat is remarkably reduced according to a lapse of time. Therefore, the heat transferred from the reactor to the passive condensation tank is significantly reduced according to the lapse of the time after the accident.

The related art passive condensation tanks are designed considering accidental characteristics of these reactors and generally an upper part of the passive condensation tank is open to atmospheric pressure. When heat is transferred to the passive condensation tank upon an occurrence of an accident, the cooling water in the passive condensation tank which has received the heat is evaporated after being heated up and then its phase is changed into steam. The steam is then discharged to outside through the open part of the passive condensation tank, so that a thermal load is reduced by heat of vaporization.

However, the related art structure has a problem that the amount of cooling water in the passive condensation tank is gradually reduced due to a long-term operation of the passive condensation tank, and eventually exhausted. In addition, the cooling function may extend by periodically refilling the cooling water. However, if an access to the passive condensation tank is impossible due to a leakage of radioactive materials upon an occurrence of an accident, the refill of the passive condensation tank has actually a limit.

DISCLOSURE OF THE INVENTION

An aspect of the present invention is to provide a passive natural circulation cooling system, capable of maintaining a cooling function for a long time by compensating for a disadvantage of a loss of cooling function due to a capacity limitation of a passive condensation tank, and a cooling method using the same.

Another aspect of the present invention is to provide a passive natural circulation cooling system, capable of being operated merely by a natural driving force without a separate action of a driver (or operator) even when a station black out occurs or an access of the driver is impossible due to a leakage of a radioactive material, and a cooling method using the same.

A passive natural circulation cooling system according to the present invention may include a passive condensation tank configured to accommodate cooling water therein, and a condensate water recirculation device provided in or above the passive condensation tank and configured to condense the cooling water so that the cooling water circulates inside the passive condensation tank. The condensate water recirculation device may include a duct extending upward from an upper portion of the passive condensation tank, and a plurality of separators provided in the passive condensation tank or the duct.

The plurality of separators may include a first separator extending downward from one side of an inner wall of the passive condensation tank toward another side in an inclined manner, to partition lower and upper portions as first and second spaces, respectively.

In one embodiment of the present invention, the plurality of separators may further include at least one of second and third separators extending along a lengthwise direction of the duct to minimize a leakage of steam rising along the duct.

In an embodiment, the second and third separators may be spaced apart from each other. The second separator may extend upward from the first separator. The third separator may extend downward from an upper inner wall of the duct to generate a downward flow path of steam rising along the second separator.

In an embodiment, the first separator may be provided with a steam collection guide pipe. The steam collection guide pipe may extend into a lower space of the first separator and an inner space of the duct partitioned by the second separator.

In an embodiment, an inserted length of the steam collection guide pipe into the lower space of the first separator may be determined based on information related to a preset water level and pressure.

In an exemplary embodiment, the duct may be provided therein with a heat exchanger to transfer heat of the cooling water inside the duct to external air, and the heat exchanger may include external air flow paths in a form of a bundle, formed in a manner of penetrating through the duct.

In an embodiment, above the first separator may be provided an exhaust valve for filling water, and a safety valve for suppressing a pressure rise in a preset range or more within the passive condensation tank.

In an embodiment, the duct may be provided with an external air outlet formed on an upper side thereof, and the external air outlet may be provided therein with a condensate water collecting structure for further collecting condensate water.

The passive natural circulation cooling system according to another embodiment of the present invention may further include a heat exchanger installed below the first separator to receive heat from the cooling water within the first space.

In an embodiment, the heat exchanger may include an inlet formed on the first separator to allow the cooling water in the second space to be introduced therethrough, an outlet formed on the first separator at a position spaced apart from the inlet to allow the cooling water introduced through the inlet to flow out therethrough, and a body portion connecting the inlet and the outlet on a rear surface of the first separator, and configured so that the introduced cooling water is evaporated by exchanging heat with the cooling water within the first space while passing through the body portion.

Preferably, the outlet may be located higher than the inlet above the first separator.

The body portion may be formed to be inclined upward from the inlet to the outlet.

The body portion may include a plurality of tubes formed in a bundle to increase a heat exchange area.

The inlet and the outlet may be provided in plurality, respectively. The body portion may include a plurality of first pipes each having one side connected to each of the plurality of inlets and another side extending downward, a plurality of second pipes each having one side connected to the another side of each of the plurality of first pipes, and another side formed in an inclined direction, and a plurality of third pipes each having one side connected to the another side of each of the plurality of second pipes, and another side extending upward to be connected to each of the plurality of outlets.

The body portion may further include a first connection portion connecting the plurality of first pipes and the plurality of second pipes so that the cooling water introduced from each of the plurality of first pipes is joined and then dispersed again into the plurality of second pipes, and a second connection portion connecting the plurality of second pipes and the plurality of third pipes so that the cooling water introduced from each of the plurality of second pipes is joined and then dispersed again into the plurality of third pipes.

The first exchanger may be provided in plurality, and heights of the inlet and the outlet of each of the first exchangers may be sequentially reduced on the first separator.

The condensate water recirculation device may further include a second separator located above the first separator with being spaced apart from the first separator, to condense steam evaporated from the cooling water in the second space and steam generated in the heat exchanger.

The second separator may extend downward from one side of the passive condensation tank toward another side in an inclined manner.

The second separator may preferably be provided with a plurality of protrusions formed on one surface thereof in a protruding manner to increase heat exchange efficiency.

A plurality of partitions may be formed on an inner wall of the duct to induce condensation of steam contained in air rising along the duct.

An outer wall of the duct may be formed of a material having a low absorption rate by solar radiation, high reflectance, and high emissivity toward surrounding air, so as to suppress a temperature rise inside the duct.

Effects of the Invention

According to the present invention having the aforementioned structure, in the multi-stepped condensate water recirculation device, the steam evaporated in the passive condensation tank can be condensed after transferring heat to components of the condensate water recirculation device in each step, and a flow path can be formed such that the condensate water circulates within the passive condensation tank. This may result in condensing and recirculating the steam leaked out of the passive condensation tank. Therefore, even when the passive condensation tank can not be re-filled with the cooling water due to a leak of radiation upon an occurrence of a reactor accident, the passive condensation tank can be operated by natural driving force so as to passively collect condensed water and refill the cooling water therein, thereby constantly maintaining a cooling water level without an extension of a capacity of the passive condensation tank. Therefore, the cooling function of the passive condensation tank can be maintained even when power use is interrupted for a long time and various reactor accidents occur.

Further, according to the present invention, sensible heat and residual heat emitted from the reactor can be removed for a long time by maintaining the function of the passive condensation tank for a long time.

DETAILED DESCRIPTION OF THE INVENTION

Hereinafter, description will be given in more detail of a passive natural circulation cooling system and a cooling method of the same according to the present invention, with reference to the accompanying drawings. For the sake of brief description with reference to the drawings, the same or equivalent components will be provided with the same reference numbers, and description thereof will not be repeated. A singular representation used herein may include a plural representation unless it represents a definitely different meaning from the context.

In addition, cooling water refers to a liquid state, but may be used to refer to steam in some contexts.

Prior to describing a passive natural circulation cooling system according to the present invention, a related passive auxiliary feed water system will be described first.

Figure 1:
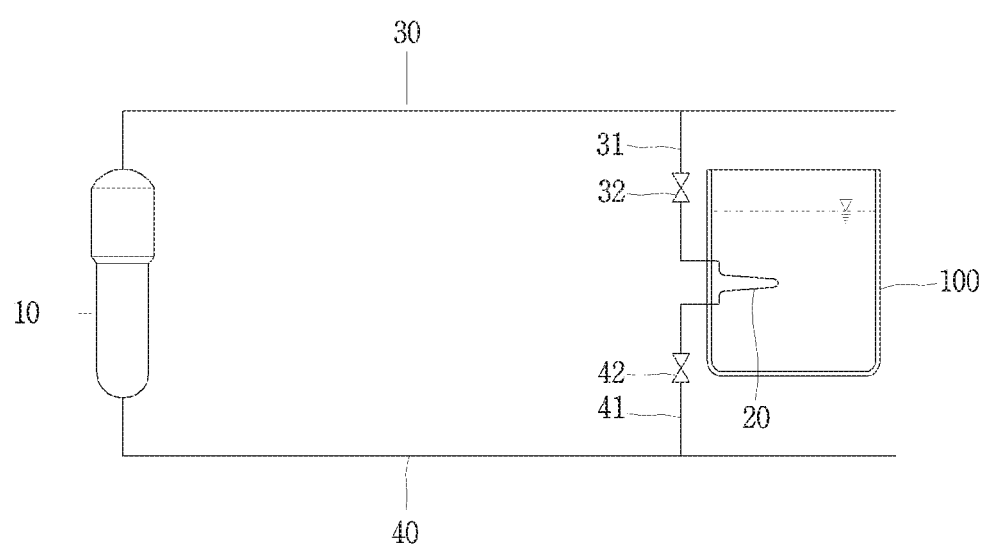
FIG. 1 is a conceptual view of a passive auxiliary feed water system in accordance with one embodiment of the present invention.

FIG. 1 is a conceptual view of a passive auxiliary feed water system in accordance with the present invention. The passive auxiliary feed water system is configured to remove residual heat continuously generated in a reactor core (not illustrated) even after the reactor is shut down upon an occurrence of a reactor accident.

Hereinafter, components of the passive auxiliary feed water system and their roles will be described in detail.

The passive auxiliary feed water system includes a steam generator 10 connected to a main steam pipe 30 and a main feed water pipe 40, a condensation heat exchanger inlet connection pipe 31 connected to the main steam pipe 30, a condensation heat exchanger outlet connection pipe 41 connected to the main feed water pipe 40, and a condensation heat exchanger 20 connected to the condensation heat exchanger inlet connection pipe 31 and the condensation heat exchanger outlet connection pipe 41.

The steam generator 10 is connected to a reactor (not illustrated) to generate steam by using heat transferred from the reactor. One side of an upper portion of the steam generator 10 is connected to the main steam pipe 30, and one side of a lower portion thereof is connected to the main feed water pipe 40.

That is, the steam generator 10 receives water through the main feed water pipe 40, and supplies generated steam through the main steam pipe 30. The generated steam is supplied to a turbine (not illustrated) so as to produce electric power by a rotation of the turbine.

However, since it is more important to lower temperatures of the reactor (not illustrated) and the steam generator 10 than to produce electric power upon an occurrence of a reactor accident, an inlet valve 32 and an outlet valve 42 are opened to activate the passive auxiliary feed water system.

When the passive auxiliary feed water system is operated, a part of the steam supplied through the main steam pipe 30 is supplied to the condensation heat exchanger 20 through the condensation heat exchanger inlet connection pipe 31.

The condensation heat exchanger 20 is provided within the passive condensation tank 100 accommodating the cooling water therein. Therefore, the steam passing through the condensation heat exchanger 20 transfers heat to the cooling water within the passive condensation tank 100, changes its phase into a liquid state, and then flows into the main feed water pipe 40 again through the condensation heat exchanger outlet connection pipe 41.

On the other hand, although the cooling water in the passive condensation tank 100 is evaporated by receiving heat through the condensation heat exchanger 20, such that a thermal load is reduced by heat of vaporization. However, when the cooling water is fully evaporated and exhausted, the passive condensation tank 100 does not operate any more, thereby causing a limit of long-term cooling.

Accordingly, the condensate water recirculation device 200 improves a heat exchange method of the passive condensation tank 100 to fundamentally eliminate the problem of exhaustion of the cooling water in the passive condensation tank 100. Since the cooling water in the passive condensation tank 100 can be circulated by the operation of the condensate water recirculation device 200, the passive condensation tank 100 can perform a heat dissipating function for a longer term of time.

Hereinafter, with reference to FIGS. 2 and 3, the passive natural circulation cooling system will be described in more detail.

Figure 2:
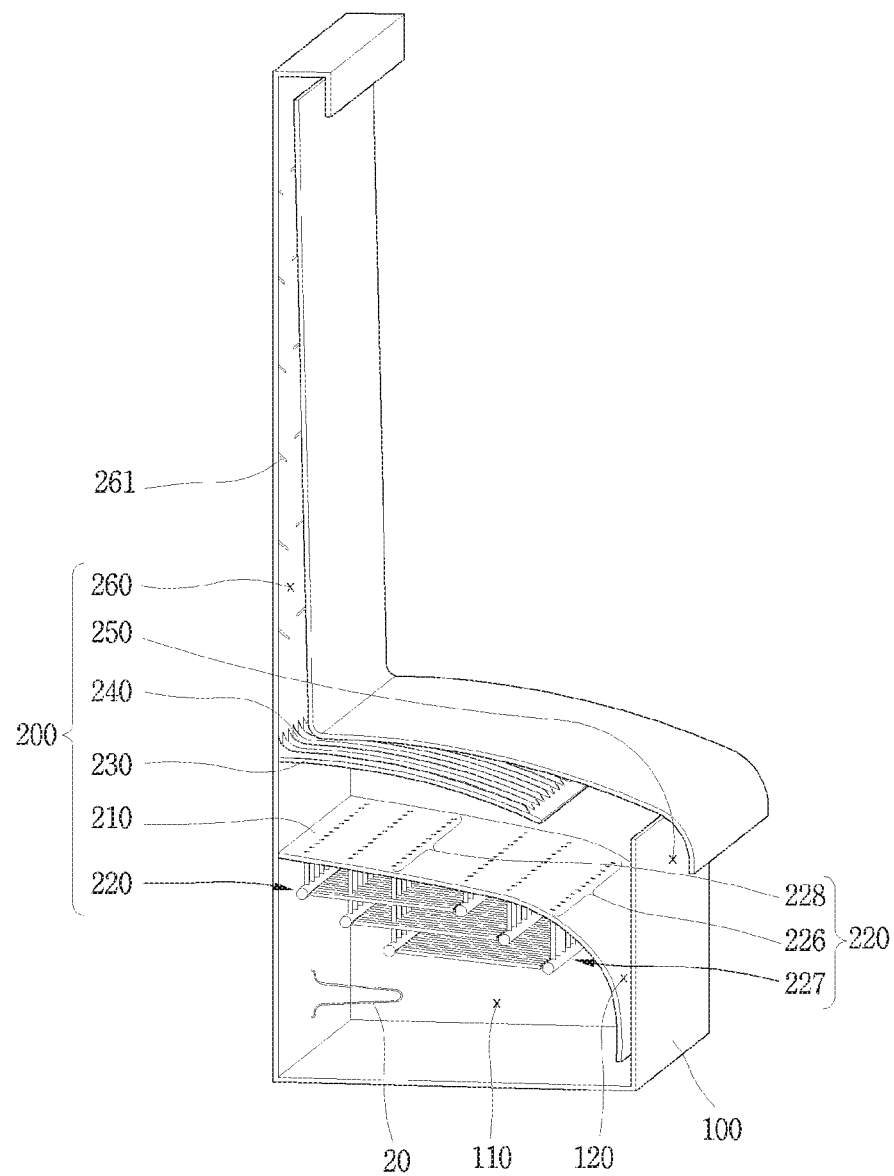
FIG. 2 is a projected perspective view of a passive natural circulation cooling system in accordance with one embodiment of the present invention.
Figure 3:
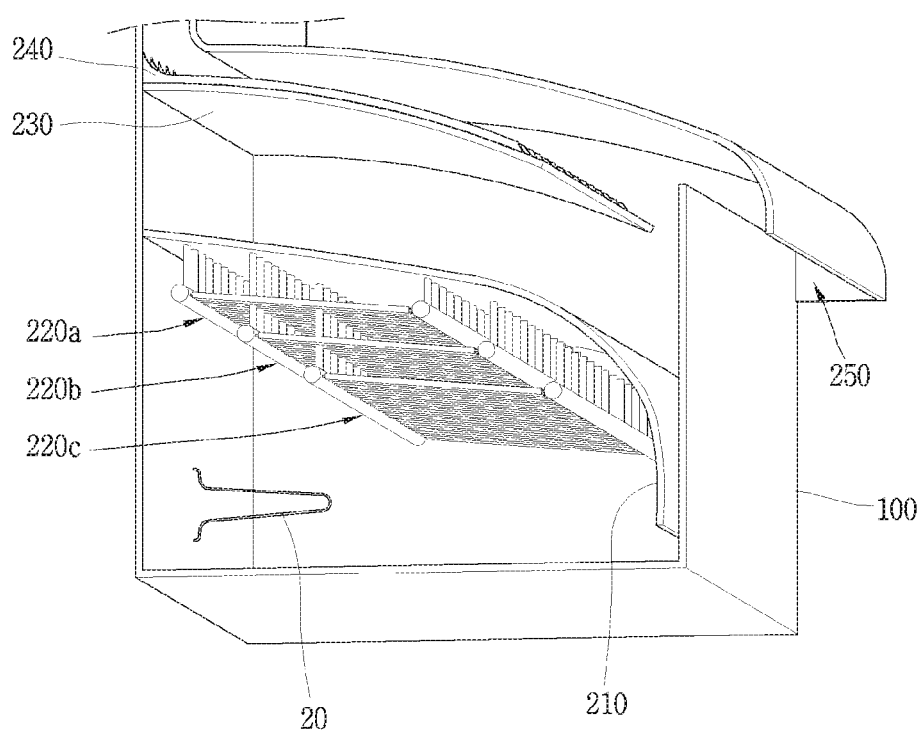
FIG. 3 is a projected perspective view of an enlarged portion of a passive natural circulation cooling system in accordance with one embodiment of the present invention.

FIG. 2 is a projected perspective view of a passive natural circulation cooling system including the condensate water recirculation system 200 in accordance with one embodiment of the present invention, and FIG. 3 is a projected perspective view of an enlarged portion of the passive natural circulation cooling system in accordance with one embodiment of the present invention.

The passive natural circulation cooling system of the present invention includes a passive condensation tank 100, a condensation heat exchanger 20, and a condensate water recirculation device 200.

The passive condensation tank 100 is formed to accommodate cooling water therein. The passive condensation tank 100 is preferably formed in a manner that a rear surface thereof is flat to correspond to the ground surface so as to stably accommodate the cooling water. In addition, although FIGS. 1 to 2 illustrate the passive condensation tank 100 in a substantially rectangular parallelepiped shape, the passive condensation tank 100 may be formed in various shapes such as a cylindrical shape. In addition, the passive condensation tank 100 may be located outside a containment building 50.

The condensation heat exchanger 20 is provided in the passive condensation tank 100 so as to be in contact with the cooling water. Concretely, the condensation heat exchanger 20 is preferably located at a lower portion in an inner space of the passive condensation tank 100 to be sunk in the cooling water as much as possible even if a water level of the cooling water changes. As described above, the condensation heat exchanger 20 serves to transfer heat received from the steam generator 10 to the cooling water of the passive condensation tank 100.

The condensate water recirculation device 200 is provided inside or above the passive condensation tank 100. The condensate water recirculation device 200 condenses the cooling water that evaporates from the passive condensation tank 100, so that the cooling water circulates inside the passive condensation tank 100.

The condensate water recirculation device 200 includes a first separator 210.

The first separator 210 extends downward from one side of an inner wall of the passive condensation tank 100 to another side of the passive condensation tank 100. One side of the first separator 210 may be integrally formed on the one side of the inner wall of the passive condensation tank 100. Alternatively, the first separator 210 and the passive condensation tank 100 may be separately formed and coupled to each other in a welding or bolting manner. Meanwhile, another side of the first separator 210 is not connected to the passive condensation tank 100.

The first separator 210 may be formed in a plate shape having a predetermined thickness and a large surface of the plate may be positioned to face a lower and/or upper portion of the passive condensation tank 100.

The first separator 210 may extend downward at a predetermined inclination angle. Alternatively, the first separator may extend with a curvature. In this instance, the first separator 210 is preferably convex upward.

The inner space of the passive condensation tank 100 is partitioned into first and second spaces 110 and 120 with reference to the first separator 210. Specifically, the first space 110 is located at a lower portion and the second space 120 is located at an upper portion, with respect to the first separator 210.

Since the another side of the first separator 210 is not connected to the passive condensation tank 100, the first and second spaces 110 and 120 are not completely separated from each other but have a portion therebetween to communicate with each other. Since the cooling water can freely move through this portion, overpressure of the passive condensation tank due to steam pressure generated in the first space is prevented.

Since the first separator 210 is located at an upper portion of the first space 110, the cooling water evaporated in the first space 110 is sealed by the first separator 210. Steam pressure generated due to the steam collected in the first space 110 lowers a water level of the cooling water in the first space 110. This will be described in detail later.

The condensate water recirculation device 200 may further include a heat exchanger 220 in addition to the first separator 210. The heat exchanger 220 is installed on a lower portion of the first separator 210 to receive heat from the cooling water in the first space 110.

The heat exchanger 220 includes an inlet 226, a body portion 227, and an outlet 228.

The inlet 226 is formed on the first separator 210, so that the cooling water in the second space 120 flows into the heat exchanger 220 therethrough. The outlet 228 is formed on the first separator 210 at a position spaced apart from the inlet 226, so that the cooling water introduced through the inlet 226 flows out therethrough. The body portion 227 connects the inlet 226 and the outlet 228 on the rear surface of the first separator 210.

The inlet 226 and the outlet 228 are formed in a shape of a hole penetrating through the first separator 210, so that at least part of the body portion 227 can be inserted into the inlet 226 and the outlet 228. In addition, the body portion 227 may be formed in a hollow tube shape so that a fluid can flow therein.

The cooling water introduced through the inlet 226 exchanges heat with the cooling water inside the first space 110 while flowing along the inside of the body portion 227. Specifically, since the condensation heat exchanger 20 is disposed in the first space 110, the cooling water in the first space 110 first receives heat from the condensation heat exchanger 20. Since the cooling water in the body portion 227 is relatively low in temperature compared to the cooling water in the first space 110, heat is transferred from the cooling water in the first space 110 to the cooling water in the body portion 227. The cooling water in the body portion 227 that has received the heat is heated up and/or evaporated, and discharged through the outlet 228 by a natural convection phenomenon.

At this time, the outlet 228 is positioned higher than the inlet 226 on the first separator 210. In addition, an initial water level of the cooling water is located above the outlet 228. Details of this will be described later.

In addition, the body portion 227 is inclined in a direction from the inlet 226 to the outlet 228, such that hot steam generated in the body portion 227 can be discharged only through the outlet 228 other than the inlet 226. This is because the cooling water in a liquid state and the steam in a gaseous state may coexist in the body portion 227 and the relatively high-temperature steam tends to rise by the convection phenomenon.

That is, the cooling water in the second space 120 may move in a direction sequentially through the inlet 226, the body portion 227, and the outlet 228.

Figure 4A:
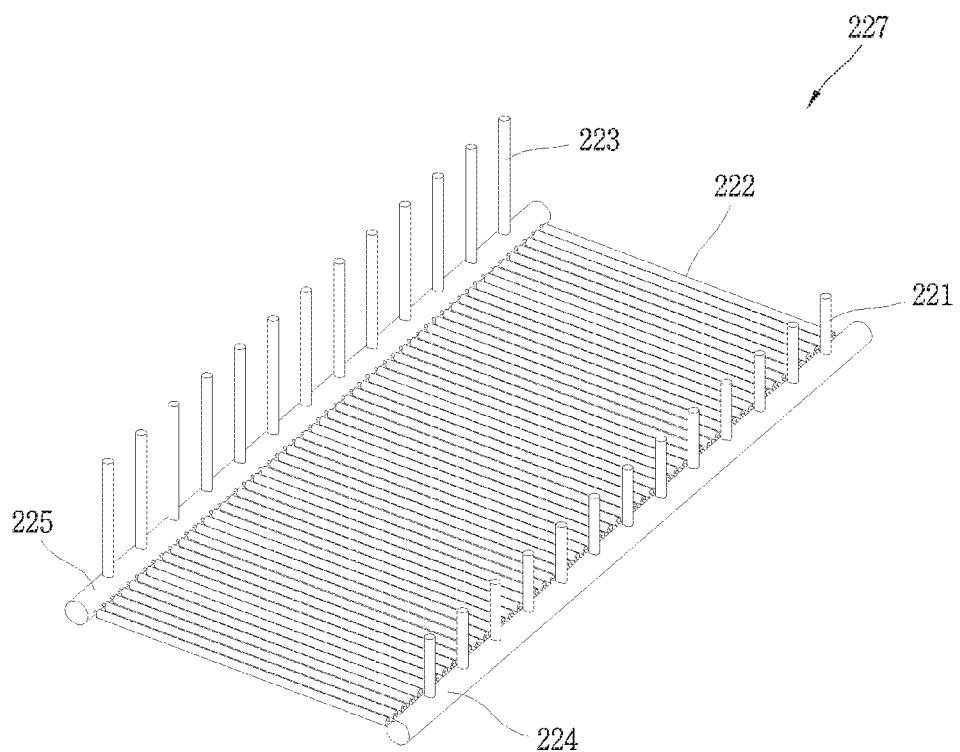
FIGS. 4A and 4B are views of a heat exchanger in accordance with another embodiment of the present invention.
Figure 4B:
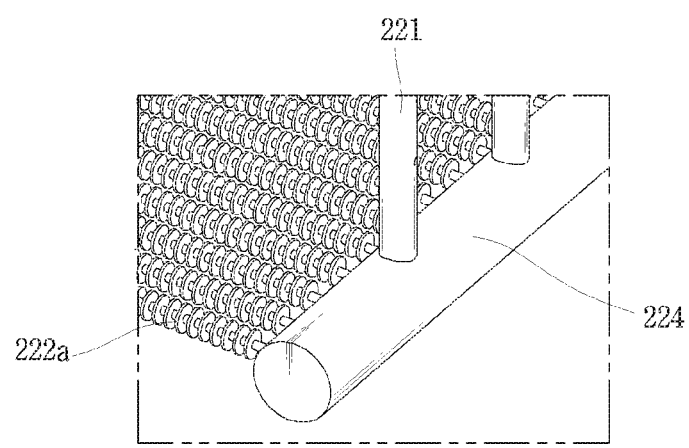

FIGS. 4A and 4B illustrate the heat exchanger 220 in accordance with one embodiment of the present invention. Hereinafter, the structure of the heat exchanger 220 will be described with reference to FIGS. 4A and 4B.

The inlet 226 and the outlet 228 of the heat exchanger 220 may be provided in plurality, respectively, and the body portion 227 may be provided with a plurality of tubes formed in a bundle so as to increase a heat exchange area.

Specifically, the body portion 227 may include a plurality of first pipes 221, second pipes 222, and third pipes 223.

One side of each of the plurality of first pipes 221 is connected to each of the plurality of inlets 226 and extends downward. One side of each of the plurality of second pipes 222 is connected to another side of each of the plurality of first pipes 221. One side of each of the plurality of third pipes 223 is connected to another side of each of the plurality of second pipes 222. In addition, another side of each of the plurality of third pipes 223 extends upward and is connected to each of the plurality of outlets 228. At this time, the second pipes 222 are formed to be inclined from the inlets 226 toward the outlets 228.

The body portion 227 may further include first and second connection portions 224 and 225, in addition to the plurality of first pipes 221, second pipes 222 and third pipes 223.

The first connection portion 224 connects the first pipes 221 and the second pipes 222 so that the cooling water in the plurality of first pipes 221 can be joined together and dispersed into the plurality of second pipes 222. That is, one side of the first connection portion 224 is connected to the plurality of first pipes 221, and another side thereof is connected to the plurality of second pipes 222.

The second connection portion 225 connects the second pipes 222 and the third pipes 223 so that the cooling water in the second pipes 222 can be joined together and dispersed into the plurality of third pipes 223. That is, one side of the second connection portion 225 is connected to the plurality of second pipes 222, and another side thereof is connected to the plurality of third pipes 223.

Referring to FIG. 4B, a plurality of pins 222a may be coupled along a periphery of each of the second pipes 222 of the heat exchanger 220 so as to increase the heat exchange area.

Referring to FIGS. 2 and 3, the heat exchanger 220 is provided in plurality such that a water level in the first space (zone) can be maintained higher than that in the condensation heat exchanger 20.

Specifically, a plurality of heat exchangers 220a, 220b and 220c are installed in a manner that heights of the inlet 226 and the outlet 228 of each heat exchanger 220 are sequentially reduced on the first separator 210.

The heights of the inlet 226 and the outlet 228 of each of the heat exchangers 220 are sequentially reduced, so that at least one of the heat exchangers 220 can be operated even if the water level of the cooling water in the second space 120 changes.

This will be described in more detail, with reference to FIG. 5.

FIG. 5 illustrates the three heat exchangers 220a, 220b and 220c in order to explain the heat exchanger 220 operated according to a water level of cooling water.

Figure 5A:
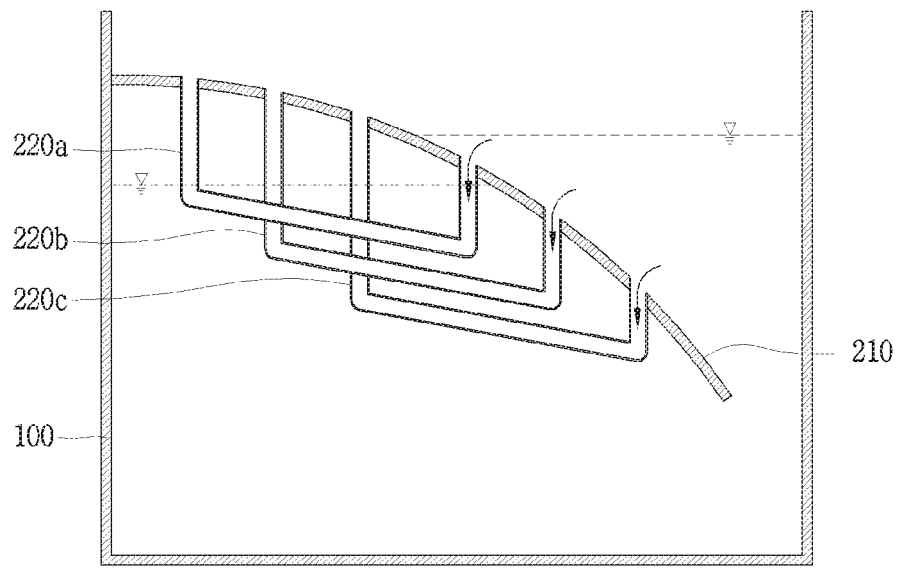
FIGS. 5A to 5C are views illustrating a heat exchanger operating according to a cooling water level in accordance with one embodiment of the invention.

As illustrated in FIG. 5A, when a sufficiently large amount of cooling water is filled in the passive condensation tank 100, the water level of the cooling water in the second space 120 becomes sufficiently high. In this case, the cooling water in the second space 120 may be all introduced into the three heat exchangers 220a, 220b and 220c. That is, all of the three heat exchangers 220a, 220b and 220c are operated.

Figure 5B:
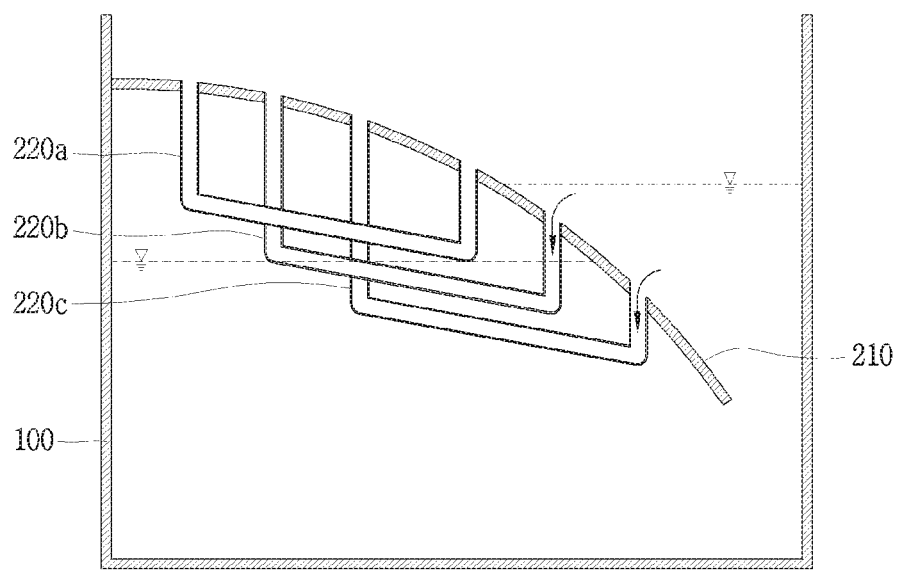
Figure 5C:
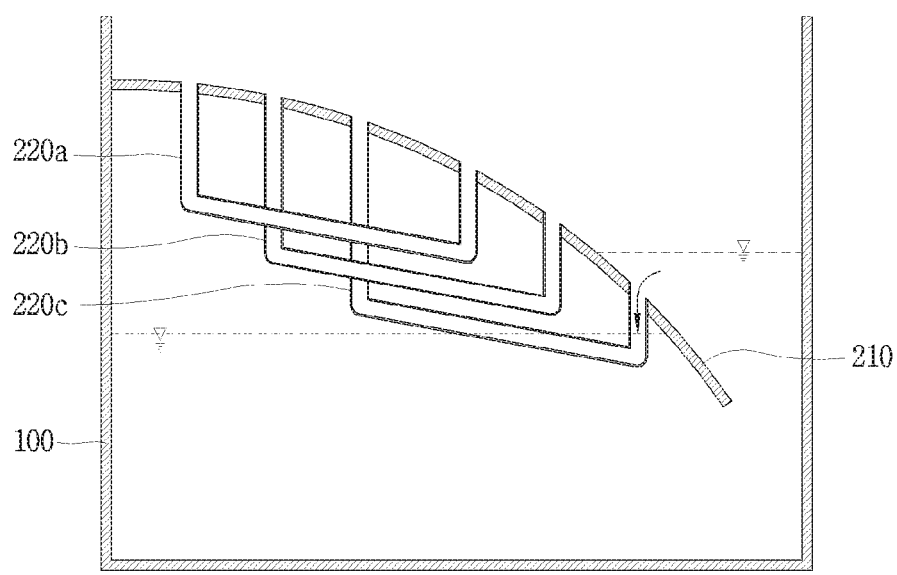

However, as illustrated in FIG. 5B or 5C, when the amount of the cooling water is more reduced than its initial amount due to a part of the cooling water in the passive condensation tank 100 being evaporated to outside of the passive condensation tank 100, the water level of the cooling water of the second space 120 is lowered. In this case, the cooling water in the second space 120 may be introduced into two or one heat exchanger. Accordingly, only some of the plurality of heat exchangers 220a, 220b and 220c are operated.

That is, installation heights of the plurality of heat exchangers 220a, 220b, and 220c may be set differently, so that the at least one heat exchanger 220 is operated regardless of the water level of the cooling water in the second space 120. This may result in improving performance of the condensate water recirculation device 200.

The condensate water recirculation device 200 may further include a second separator 230, in addition to the first separator 210 and the heat exchanger 220. Hereinafter, the second separator 230 will be described, referring back to FIGS. 2 and 3.

The second separator 230 is located above the first separator 210 in a spacing manner to condense steam evaporated from the cooling water in the second space 120 and steam generated in the heat exchanger 220.

Specifically, the second separator 230 extends downward from one side of the inner wall of the duct 260 to another side in an inclined manner. One side of the second separator 230 may be integrally formed on the one side of the inner wall of the passive condensation tank 100. Alternatively, the second separator 230 and the passive condensation tank 100 may be separately formed and coupled to each other in a welding or bolting manner. On the other hand, another side of the second separator 230 is not connected to the passive condensation tank 100.

Similar to the first separator 210, the second separator 230 may be formed in a plate shape having a predetermined thickness, and a large surface of the plate may be located to face the lower portion and/or the upper portion of the passive condensation tank 100.

The second separator 230 may extend downward at a predetermined inclination angle. Alternatively, the second separator 230 may extend with a curvature. In this instance, the second separator 230 may also be formed to be convex upward.

The second separator 230 takes heat away from surrounding hot steam so as to condense the steam. The condensed cooling water is moved down due to gravity and joined again to the cooling water in the second space 120. A phase change process will be described in detail later.

The second separator 230 includes a plurality of protrusions 240 protruding from one surface of the second separator 230, to increase heat exchange efficiency. The plurality of protrusions 240 may be located on an upper surface or a lower surface of the second separator 230 so as to protrude upward or downward. The plurality of protrusions 240 serve to increase a contact area of the second separator 230 with external air having a relatively low temperature. Meanwhile, the plurality of protrusions 240 may also be formed as a structure in a form of a pin or a plate.

In addition, the condensate water recirculation device 200 may further include an external air inlet 250 and a duct 260.

The external air inlet 250 is formed at another side of the passive condensation tank 100 to induce an introduction of external air.

The duct 260 is installed at the upper portion of the passive condensation tank 100 and extends upward so that air introduced through the external air inlet 250 is raised.

Figure 6:
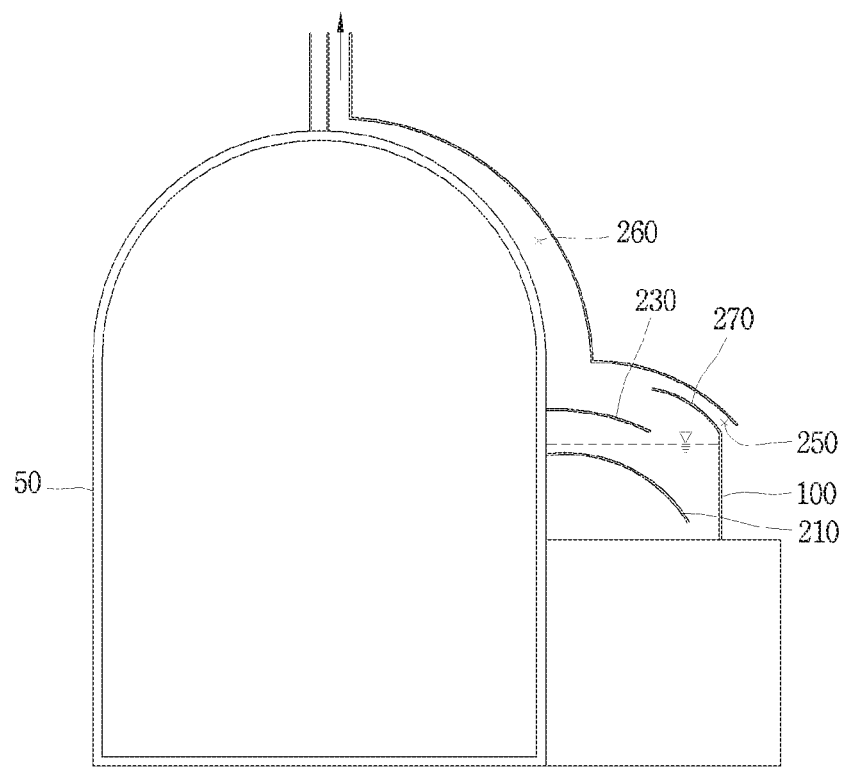
FIG. 6 is a conceptual view illustrating a passive natural circulation cooling system and a containment building in accordance with one embodiment of the present invention.

Also, referring to FIG. 6, the duct 260 may be formed upward in a linear form, but alternatively formed to correspond to appearance of the containment building 50 so as to be attached to the containment building 50. That is, the duct 260 may have a predetermined curvature and be formed in an arcuate shape. Also, the duct 260 may be attached at a distance from the containment building (containment vessel).

In addition, the duct 260 may have a rectangular or circular shape, but is not limited to a particular shape.

The air introduced through the external air inlet 250 receives internal heat of the passive condensation tank 100 to be lowered in density, and flows upward along the duct 260 to be discharged to outside. In consideration of such convection, the external air inlet 250 is located at a position lower than the duct 260.

Also, the second separator 230 is located on a path through which the air introduced through the external air inlet 250 flows. Temperature of the second separator 230 becomes lower than surrounding steam due to air cooling, so that the second separator 230 can perform heat exchange with the high temperature steam.

A plurality of partitions 261 may be formed on the inner wall of the duct 260 in order to minimize an outflow and induce condensation of steam contained in the air flowing upward. One side of each of the partitions 261 is formed on one side of the inner wall of the duct 260. In addition, another side of each of the partitions 261 extends downward so that the cooling water stood on the partition 261 can be dropped into the second space 120. On the other hand, the plurality of partitions 261 are formed in a staggered shape to increase a flow path of steam, thereby effectively inducing condensation.

An outer wall of the duct 260 is preferably formed of a material having a low water absorption rate, high reflectance and high emissivity so as to suppress a temperature rise inside the duct 260 due to solar heat and to radiate heat inside the duct 260 to the outside. Specifically, the outer wall of the duct 260 may be coated with a material having a white-based color.

Referring to FIG. 6, a backflow preventing structure 270 may further be installed in the passive condensation tank 100. The backflow preventing structure 270 may extend inwardly from the another side of the passive condensation tank 100. The backflow preventing structure 270 prevents the cooling water in the passive condensation tank 100 from overflowing to outside.

Hereinafter, a passive natural circulation cooling method will be described sequentially with reference to FIG. 7.

Figure 7A:
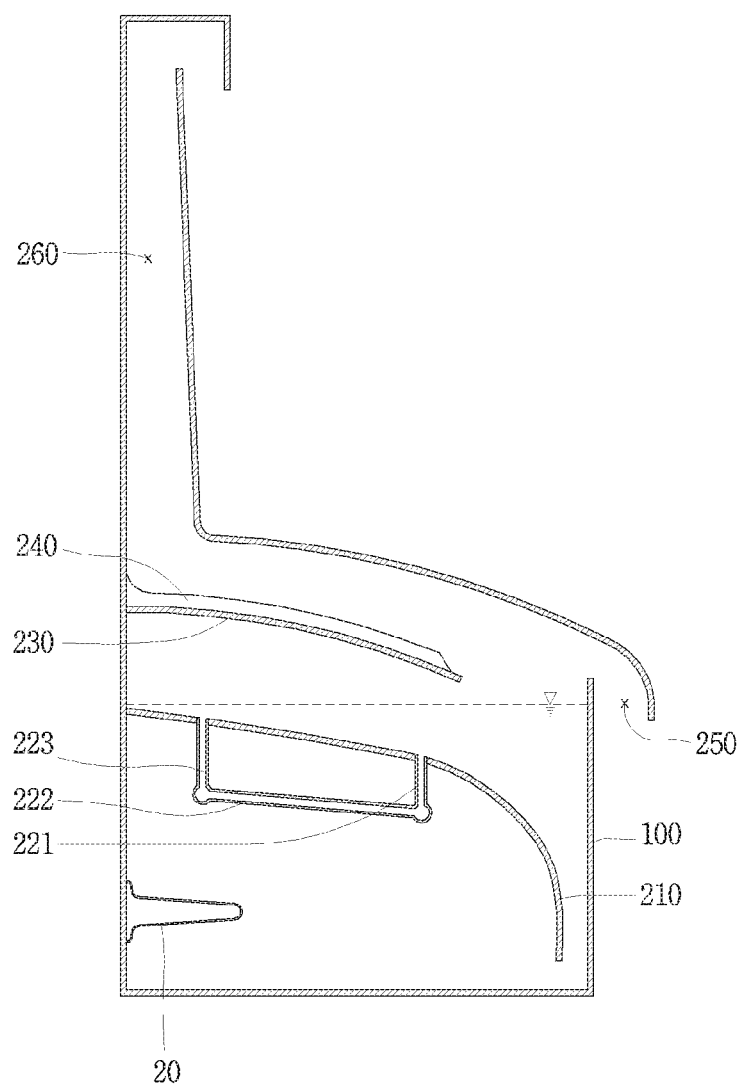
FIGS. 7A to 7E are conceptual views sequentially illustrating a method of cooling a passive natural circulation cooling system in accordance with the present invention.

Referring to FIG. 7A, when the passive auxiliary water supply system does not operate, the cooling water in the passive condensation tank 100 maintains a constant water level. At this time, an initial water level of the cooling water is located above the outlet 228.

Figure 7B:
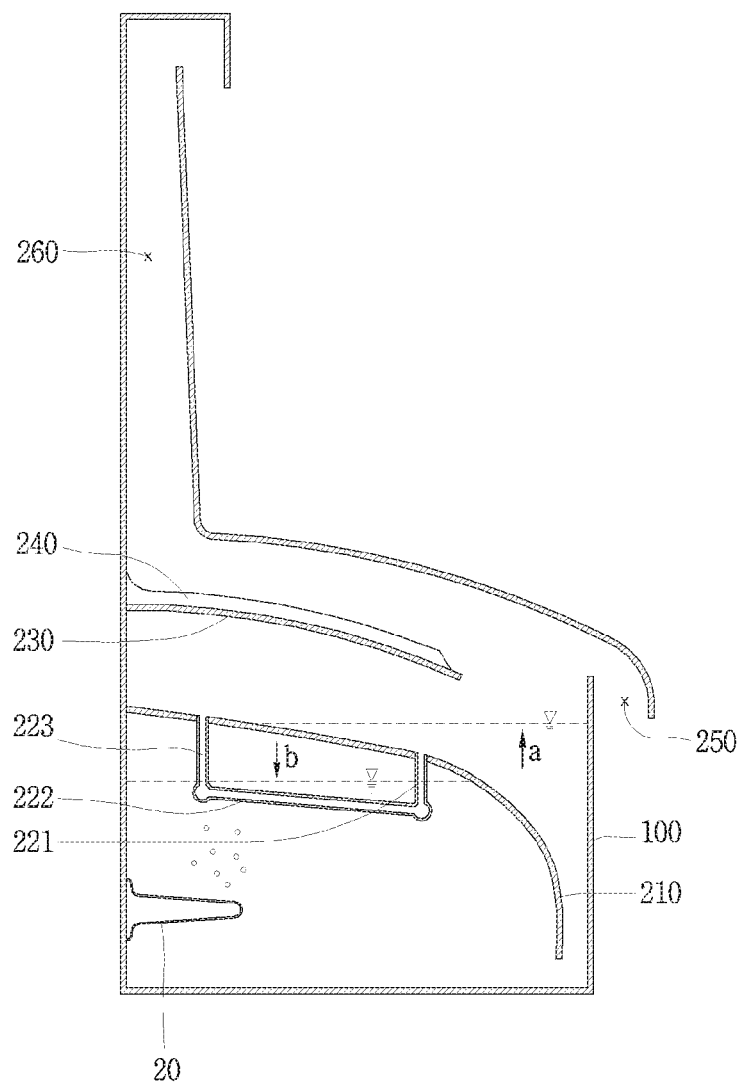

Referring to FIG. 7B, when the passive auxiliary feed water system starts to operate, the cooling water in the passive condensation tank 100 is heated up or evaporated by receiving heat from the condensation heat exchanger 20. The cooling water is subjected to evaporation in both of the first and second spaces 110 and 120. However, since the condensation heat exchanger 20 is disposed in the first space, the evaporation of the cooling water in the first space occurs more actively. At the same time, due to an influence of the first separator 210 located at the upper portion the first space 110, the steam generated in the first space 110 is collected below the first separator 210. Steam pressure higher than the atmospheric pressure is formed below the first separator 210 by the steam collected at the upper portion of the first space 110. The collected steam is used to push the cooling water downward so that the water level in the first space 110 is lower than the water level in the second space 120. As the steam works, the temperature of the steam can drop as internal energy decreases.

Figure 7C:
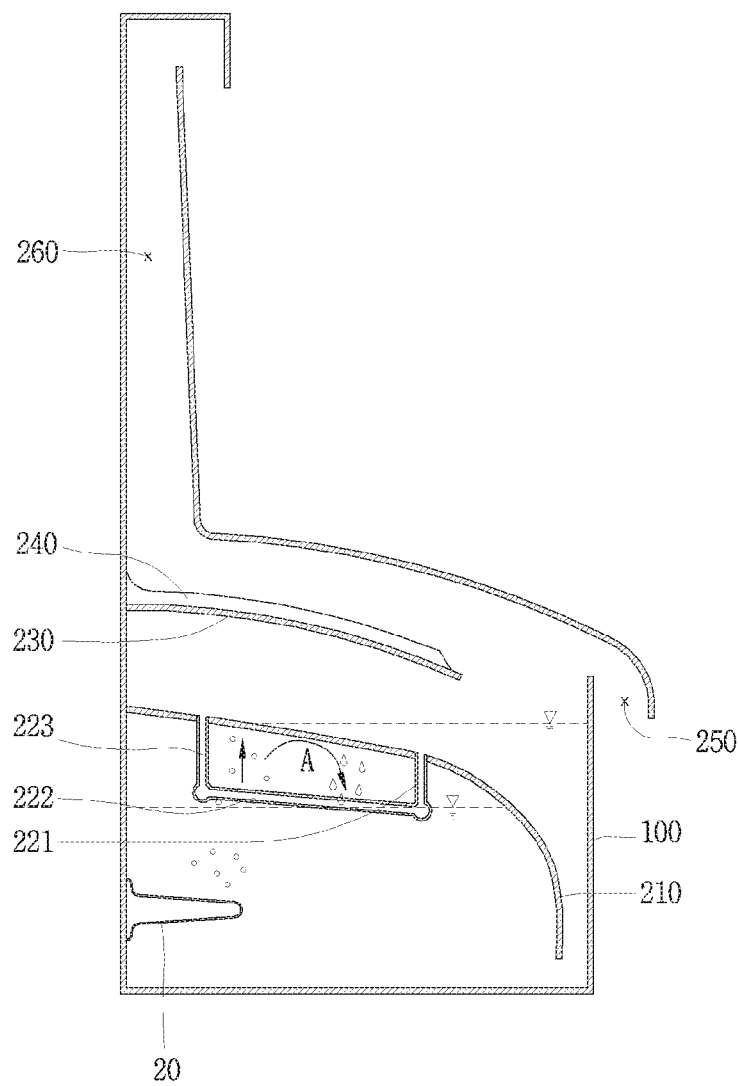

Referring to FIG. 7C, when some of the cooling water evaporated from the first space 110 are bumped against the first separator 210, such cooling water transfers heat to cooling water above the first separator 210, and then is condensed to be collected back into the first space 110. Also, some of the cooling water evaporated in the first space 110 exchange heat with cooling water within the heat exchanger 220. Such cooling water is then condensed and collected back into the first space 110. That is, the steam in the first space 110 circulates to the cooling water while forming a cycle A by the first separator 210 and the heat exchanger 220.

Figure 7D:
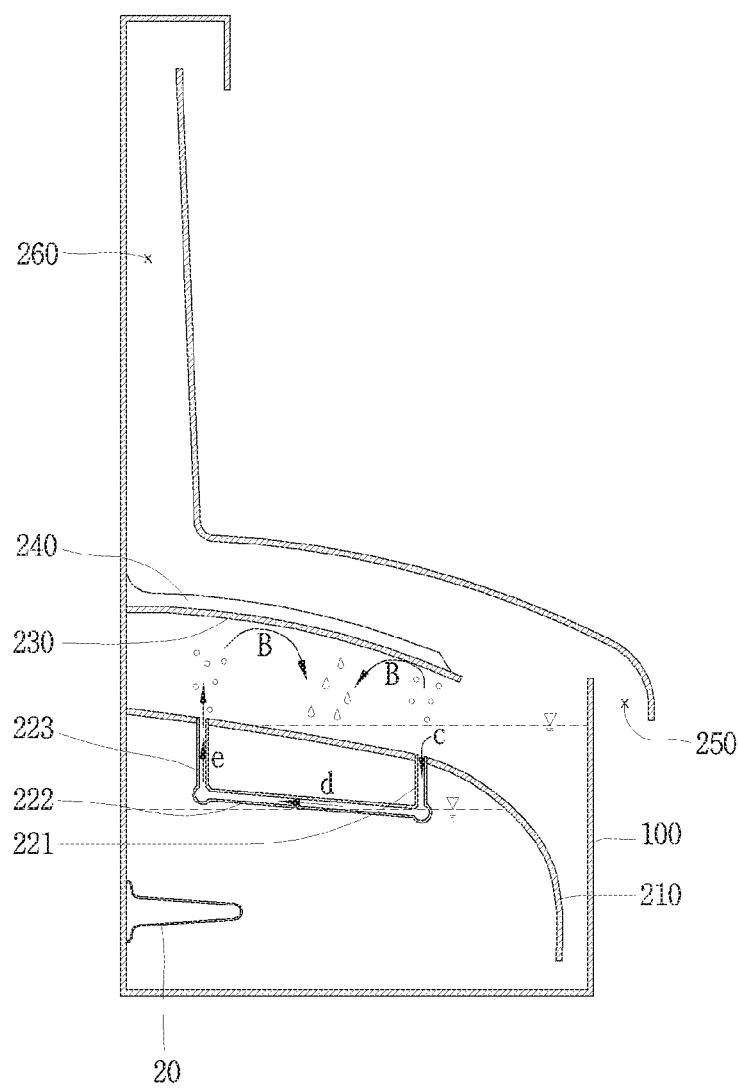

Referring to FIG. 7D, the cooling water in the second space 120 flows into the heat exchanger 220, as indicated with a flow c. The cooling water in the second space 120 is vaporized by receiving heat from the steam in the first space 110 while passing through the inside of the heat exchanger 220, as indicated with a flow d. The steam generated in the heat exchanger 220 is discharged to the upper portion of the first separator 210, as indicated with a flow e. The steam discharged to the outside of the heat exchanger 220 and the steam evaporated in the second space 120 flow upward to transfer heat to the second separator 230, are condensed and then circulate to the cooling water while forming a cycle B.

Figure 7E:
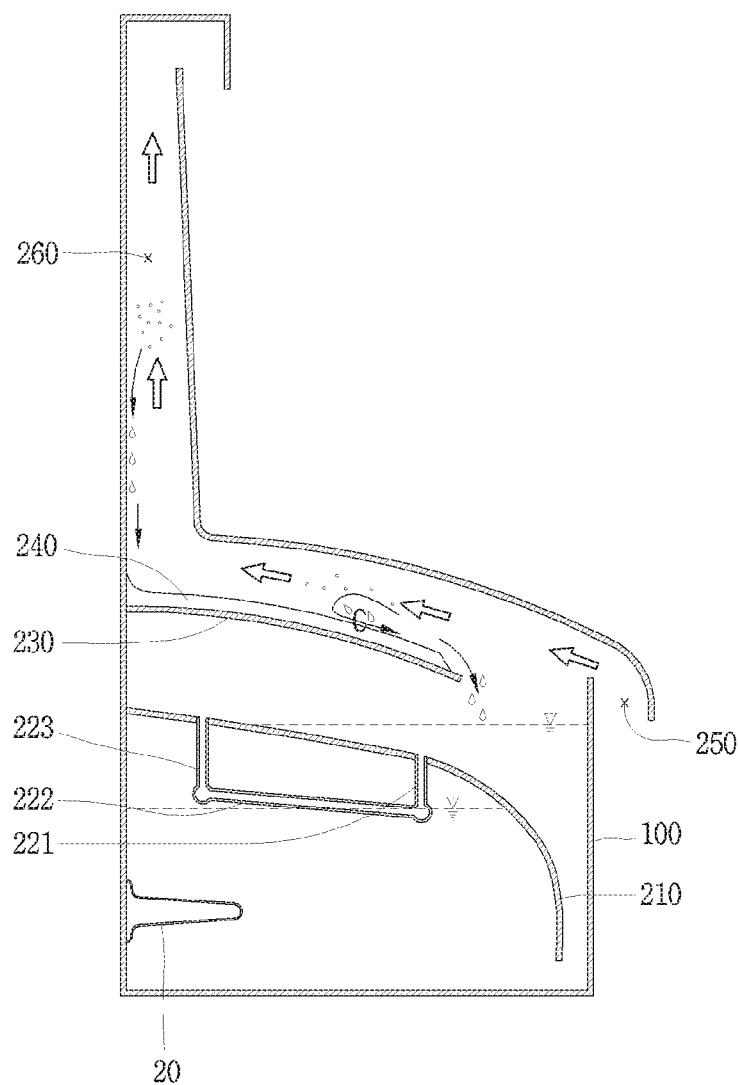

Referring to FIG. 7E, external air introduced through the external air inlet 250 receives heat from the second separator 230, and thus the temperature thereof increases. The air is then discharged to the outside through the duct 260 by the convection phenomenon.

At this time, the steam is condensed on the surface of the second separator 230 and flows downward along the second separator 230, as indicated with a cycle C. The condensed cooling water is collected back to the second space 120.

When the steam rises up to an upper portion of the duct 260 without being condensed, temperature of the upper portion of the duct 260 is relatively lower than that of a lower portion of the passive condensation tank 100, and thus the steam may be condensed on the inner wall of the duct 260 so as to be collected back into the second space 120.

Although the embodiment in which the heat exchanger 220 is installed below the first separator 210 has been described so far, the heat exchanger 220 may be omitted or installed above the duct.

Hereinafter, another embodiment in which the heat exchanger 220 is omitted will be described in detail with reference to the drawings.

Figure 8:
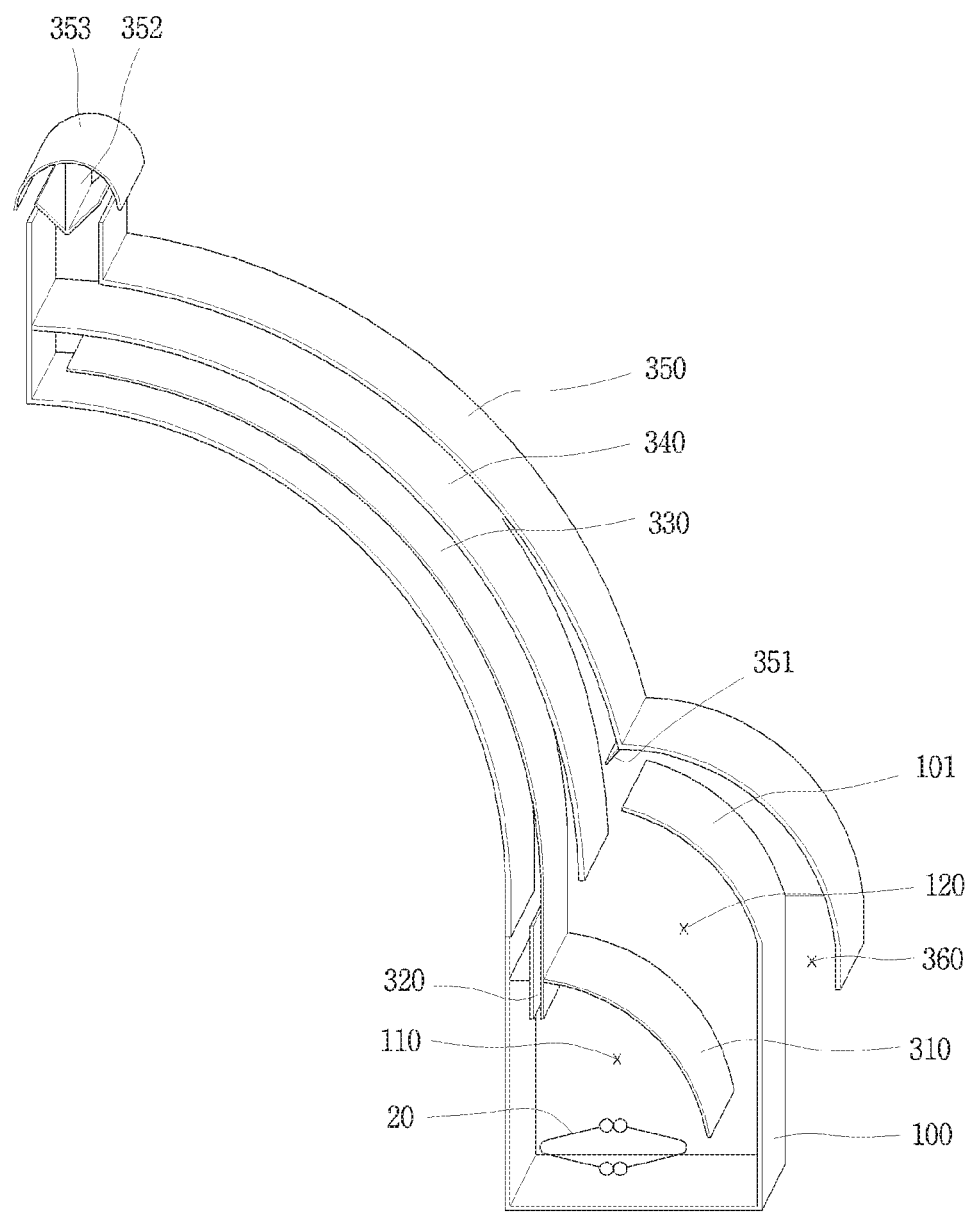
FIG. 8 is a projected perspective view of a passive natural circulation cooling system in accordance with another embodiment of the present invention.
Figure 9A:
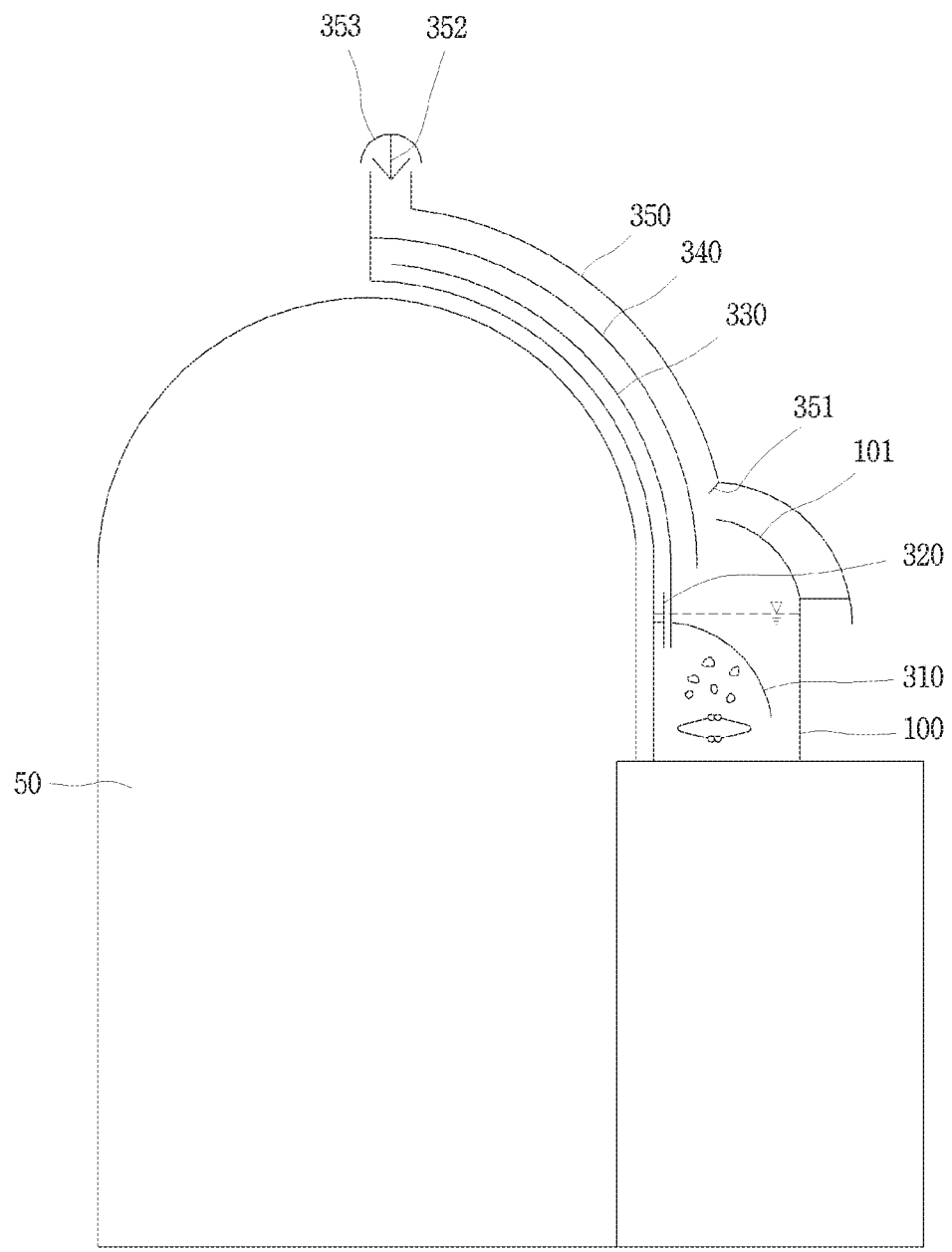
FIGS. 9A to 9B are conceptual views sequentially illustrating a method of cooling a passive natural circulation cooling system in accordance with according to another embodiment of the present invention.
Figure 9B:
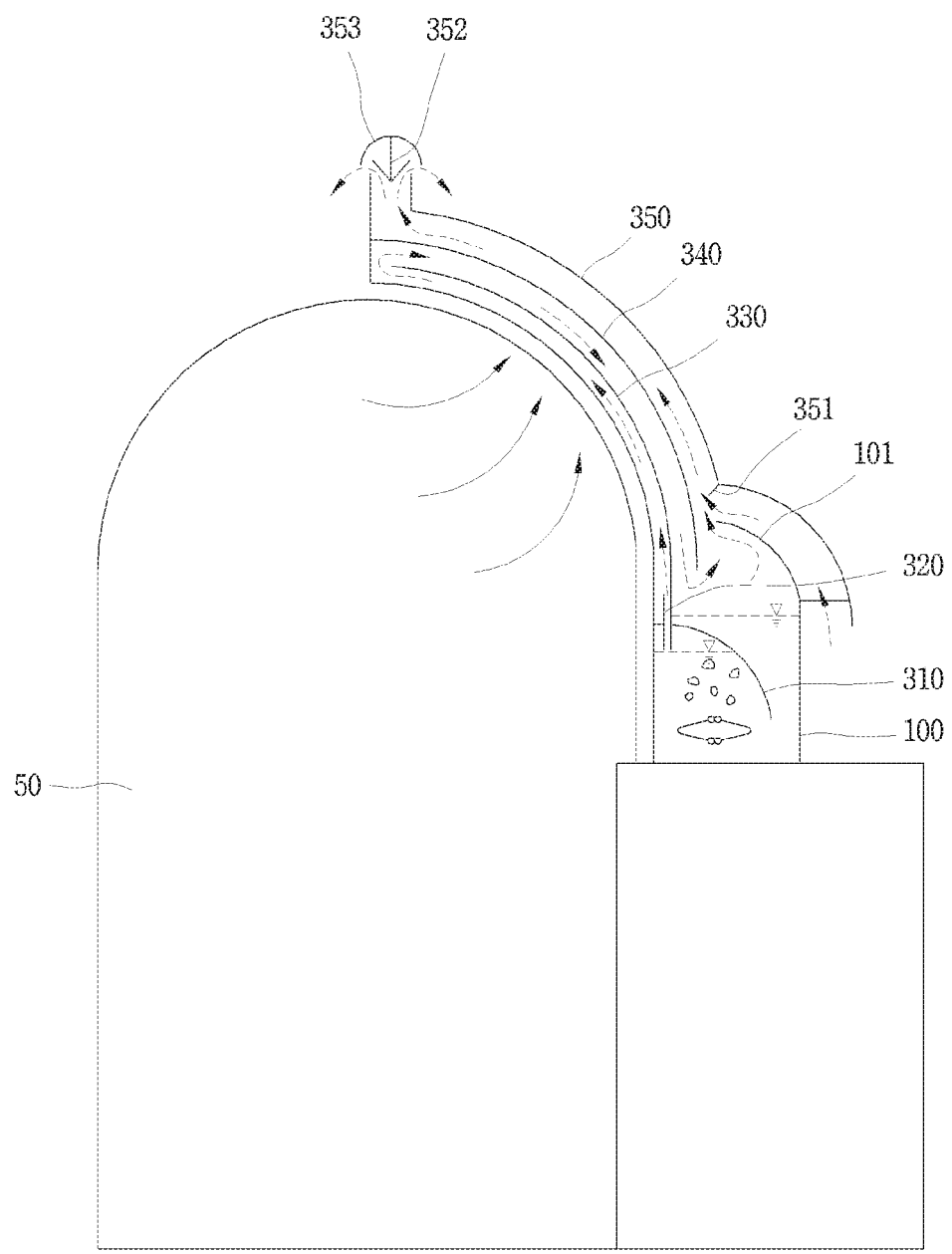

FIG. 8 is a projected perspective view of a passive natural circulation cooling system in accordance with another embodiment of the present invention. FIGS. 9A to 9B are conceptual views sequentially illustrating a method of cooling a passive natural circulation cooling system in accordance with another embodiment of the present invention.

Referring to FIG. 8, a passive natural circulation cooling system according to another embodiment of the present invention may include a passive condensation tank 100, a condensation heat exchanger 20, and a condensate water recirculation device.

The condensate water recirculation device is a device for condensing steam evaporated from the cooling water in the upper portion of the passive condensation tank 100 and recirculating back to the passive condensation tank 100. The condensate water recirculation device may include first to third separators 310, 330 and 340, and a steam collection guide pipe 320.

Detailed description of the first separator 310 is the same as or similar to that of the one embodiment of the present invention, and will not be described below.

The second and third separators 330 and 340 may be installed inside the duct 350 and extend in a lengthwise direction of the duct 350 in order to increase a flow path of steam rising through the duct 350 and ultimately extend a heat transfer time. Here, the second and third separators 330 and 340 may be spaced apart from each other.

The second separator 330 may extend upward from the first separator 310. More specifically, one side of the second separator 330 is formed on the first separator 310. The second separator is formed as a curved surface to correspond to the shape of the duct 350 as a whole and then extend with maintaining a predetermined interval from the inner wall of the duct 350 within the duct 350.

The third separator 340 may extend downward from the upper inner wall of the duct 350 to generate a downward flow path of the steam which has been raised along the second separator 320.

The steam collection guide pipe 320 is formed on the first separator 310 so that the steam generated in the first space 110 can be moved to the second space 120. At this time, the steam collection guide pipe 320 may extend into an inner space of the duct 350 defined by the second separator 330.

A diameter or depth of the steam collection guide pipe 320 may be adjusted to meet a design pressure range of the passive condensation tank 100. In addition, a safety valve or the like may be provided inside the steam collection guide pipe 320.

Meanwhile, referring to FIG. 8, a passive natural circulation cooling system according to another embodiment of the present invention may further include a backflow preventing structure 101, a condensate water guide plate 351, a condensate water collecting structure 352, and a pollution preventing structure 353.

As described above with reference to FIG. 6, the backflow preventing structure 101 may extend from the another side of the passive condensation tank 100 toward the inside thereof. The backflow preventing structure 101 may prevent the cooling water inside the passive condensation tank 100 from overflowing to outside.

The condensate water guide plate 351 is installed on the inner wall of the duct 350 to induce the condensed water condensed in the duct 350 to be re-circulated back to the second space 120.

The condensate water collecting structure 352 is installed adjacent to an external air outlet formed on the upper portion of the duct 350, to ultimately condense steam discharged through the external air outlet.

The pollution preventing structure 353 may be formed in an arcuate shape on the upper portion of the condensate water collecting structure 352.

Hereinafter, a cooling method using the passive natural circulation cooling system according to another embodiment of the present invention will be described step by step with reference to FIGS. 9A and 9B.

Referring to FIG. 9A, the condensation heat exchanger 20 transfers heat received from the steam generator 10 to the cooling water of the passive condensation tank 100. At this time, since the condensation heat exchanger 20 is disposed in the first space 110, boiling occurs in the cooling water in the first space 110.

Referring to FIG. 9B, a cavity (zone) is formed below the first separator 310 due to the steam of the cooling water in the first space 110. Here, the cavity is formed only by a protruded depth of the steam collection guide pipe 320 to a lower portion of the first separator. The steam is transferred to the upper portion of the first separator 310 through the steam collection guide pipe 320. That is, the steam that has been discharged to the upper portion of the first separator 310 through the steam collection guide pipe 320 is directly re-condensed when the cooling water is present above the first separator 310, and a part of the steam flows into the duct 350 through a zone, in which the cooling water is present, due to steam pressure and buoyancy.

At this time, pressure of the first space 110 is increased due to the formation of the cavity, but the diameter and depth of the steam collection guide pipe 320 may be adjusted or the safety valve may be provided, in consideration of the increased pressure.

The steam raised through the steam collection guide pipe 320 is subjected to convective heat transfer by a flow of external air between the containment vessel 50 and the duct 350. Since the steam is continuously generated in the passive condensation tank 100, hot steam is located in the upper portion of the duct 350 due to a heat load. Since a flow path is blocked at the upper portion of the duct and the hot steam tends to flow upward due to the buoyancy, the steam slowly flows backward between the second and third separators 330 and 340. The steam is mixed (merged, joined) with external air which flows to the upper portion of the duct 350 through the external air inlet, and then flows upward again to the upper portion of the duct 350. At this time, the heat transfer is continuously caused due to a temperature difference between the duct 350 and the third separator 340. In addition, the heated steam is increased in speed due to the buoyancy and thus the heat transfer effect is enhanced. At this time, the entire outer wall of the duct 350 is constituted by a plate-type heat exchanger so as to increase a heat transfer area by several times or more, thereby improving heat removal ability due to convective heat transfer.

By this multi-stage cooling method, a steam leakage speed in the passive condensation tank 100 is minimized, a heat exchange time is increased, and finally a total heat amount is increased. Accordingly, the steam is condensed as much as possible and then collected back into the passive condensation tank.

As described above, in the passive natural circulation cooling system according to another embodiment of the present invention, as the number of separators inside the duct 350 increases, a time during which the steam stays in the duct 350 extends, thereby increasing a total heat transfer amount.

So far, the embodiment in which the upper side of the duct 350 is opened has been described in detail. Hereinafter, another embodiment in which the upper side of the duct 350 is hermetically closed will be specifically described.

Another embodiment in which the upper side of the duct is sealed may include first to third detailed embodiments.

Figure 10:
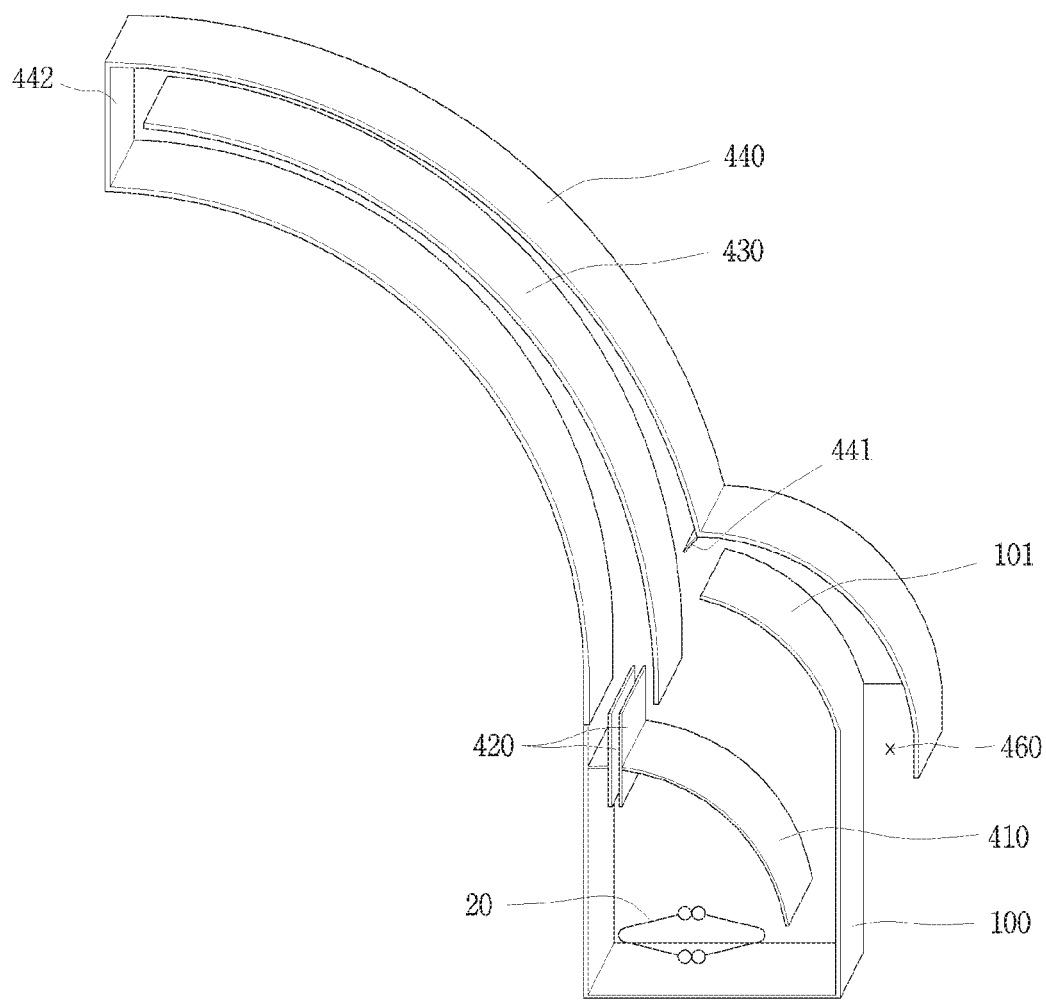
FIG. 10 is a view of a passive natural circulation cooling system in accordance with a first detailed embodiment.

Referring to FIG. 10, a passive natural circulation cooling system according to a first embodiment may include a passive condensation tank 100, first and second separators 410 and 430, and a steam collection guide pipe 420.

In this embodiment, one side of the second separator 430 may be spaced apart from the first separator 410. The second separator 430 may extend into a curved shape to correspond to a shape of the duct 440 within a duct 440. Another side of the second separator 430 may extend up to an upper side of the duct 440 and may be disposed with being spaced apart from an upper inner wall of the duct 440.

Meanwhile, the steam collection guide pipe 420 may extend into an inner space of the duct 440 defined by the second separator 430.

According to this structure, the steam in the first space 110 flows into a space between the duct and the second separator 430 along the steam collection guide pipe 420. The steam flows to the upper side of the duct 440 due to natural convection caused by a temperature difference from ambient temperature. In this embodiment, since the upper side of the duct 440 is closed, the steam that reaches the upper side of the duct 440 flows down along the second separator 430.

A heat exchanger 450 may be installed in the duct 440 to increase heat exchange efficiency.

Figure 11A:
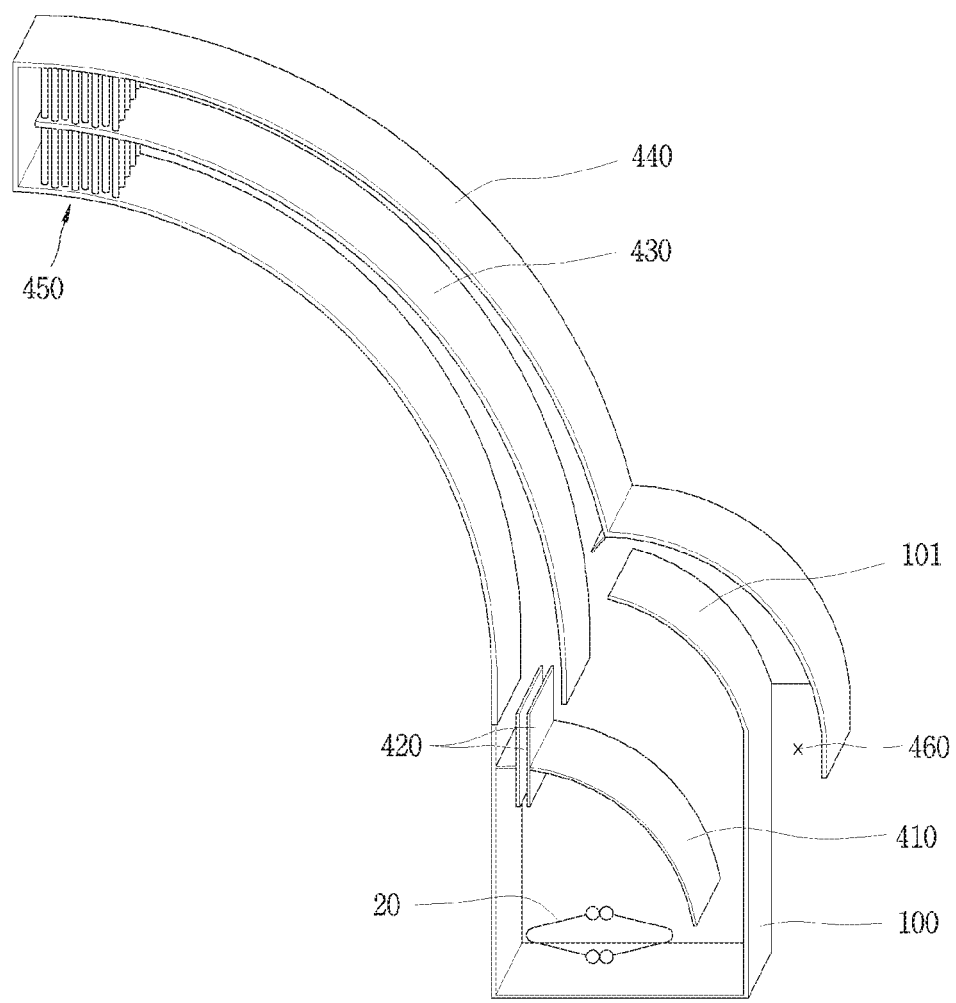
FIGS. 11A and 11B are views of a passive natural circulation cooling system in accordance with a second detailed embodiment.
Figure 11B:
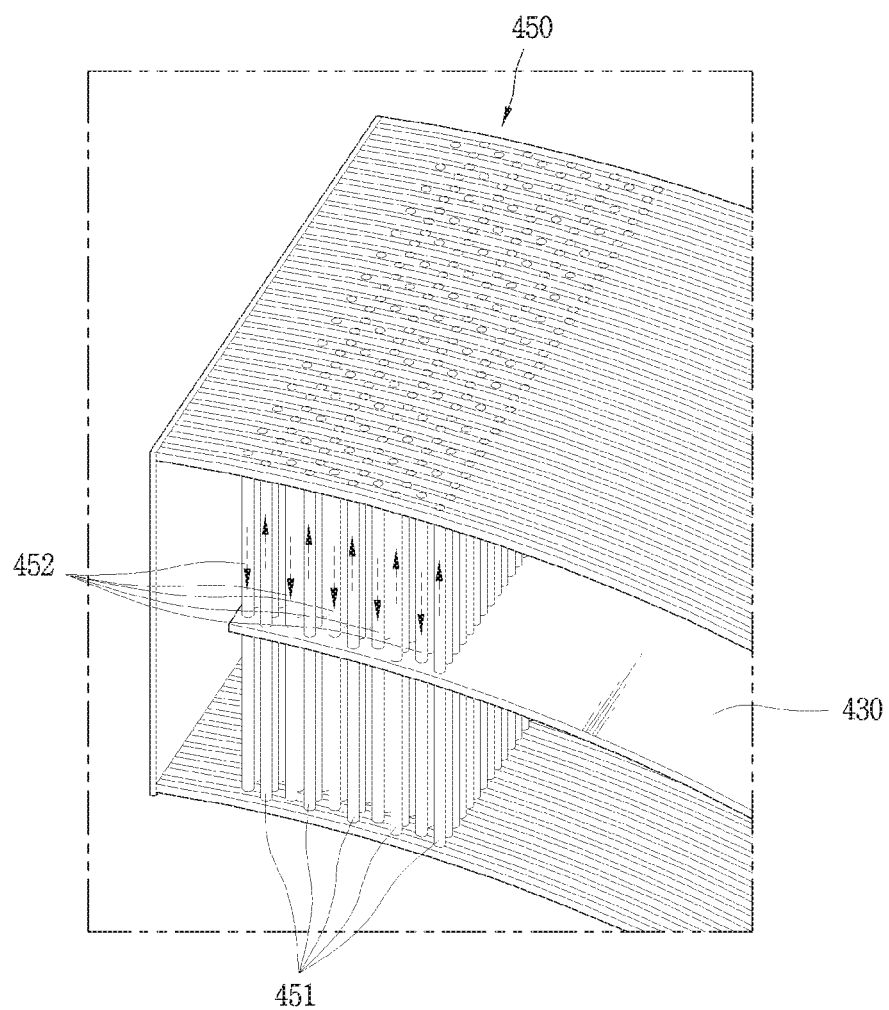

FIGS. 11A and 11B are views of a passive natural circulation cooling system in accordance with a second detailed embodiment. In the second detailed embodiment, the components other than a heat exchanger 450 may be the same as or similar to those of the first detailed embodiment.

Referring to FIG. 11A, the heat exchanger 450 may be installed in an upper side of the duct 440 of the passive natural circulation cooling system. The heat exchanger 450 is formed along a thickness direction of the duct 440 and may include external air flow paths.

Referring to FIG. 11B, the heat exchanger 450 includes a plurality of external air flow paths 451 and 452 penetrating through the second separator 430.

The plurality of external air flow paths 451 and 452 may be arranged in an alternating manner. More specifically, the external air flow paths 451 disposed along a first row of the duct 440 and the external air flow paths 452 disposed along a second row are arranged in an alternating manner. Afterwards, the arrangement of the external air flow paths along a third row is the same as that of the first row and the arrangement of the external air flow paths along a fourth row is the same as that of the third row, such that the same pattern is continuously repeated.

The external air flow paths arranged along odd-numbered rows including the first and third rows may be configured so that external air flows therein along a first direction, and the external air flow paths arranged along even-numbered rows including the second and fourth rows may be configured so that external air flows therein along a second direction.

As such, the steam can flow along the duct 440 between such external air flow paths. That is, the heat transfer between the steam in the duct 440 and external air can be further facilitated through the external air flow paths 451 and 452.

Figure 12A:
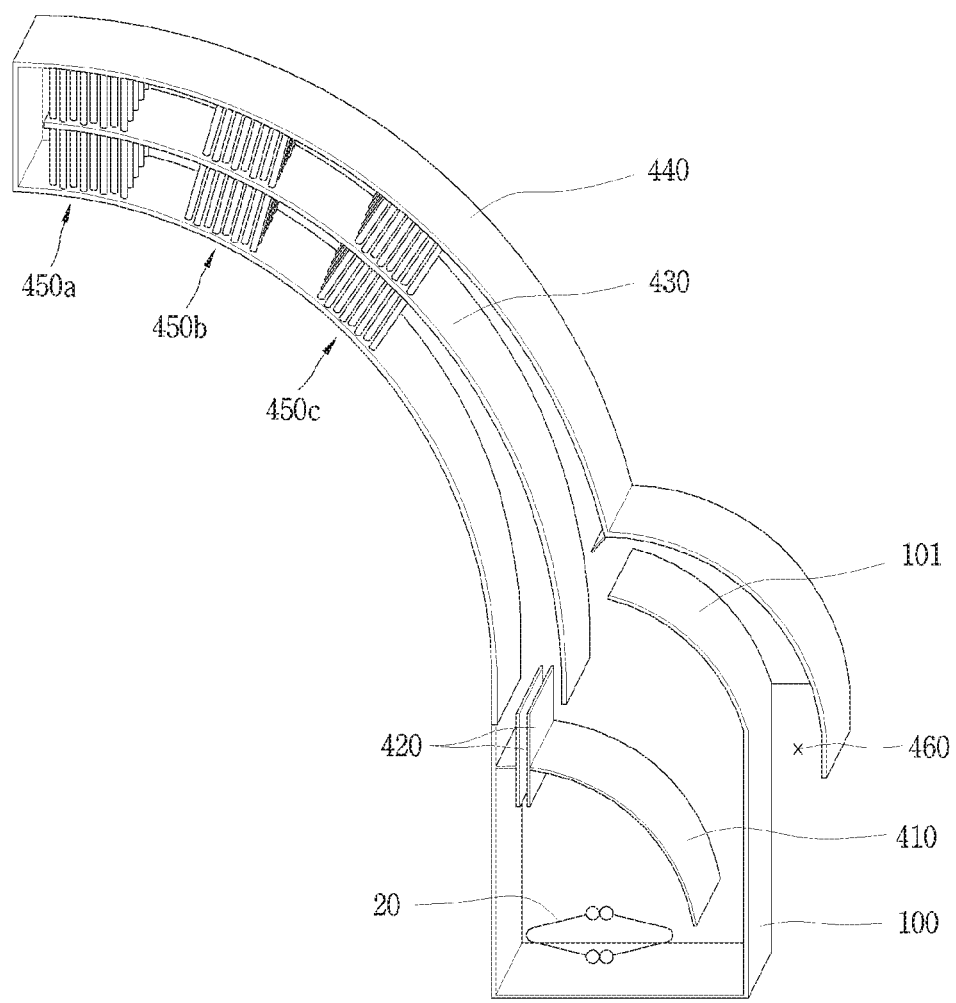
FIGS. 12A and 12B are views of a passive natural circulation cooling system in accordance with a third detailed embodiment.
Figure 12B:
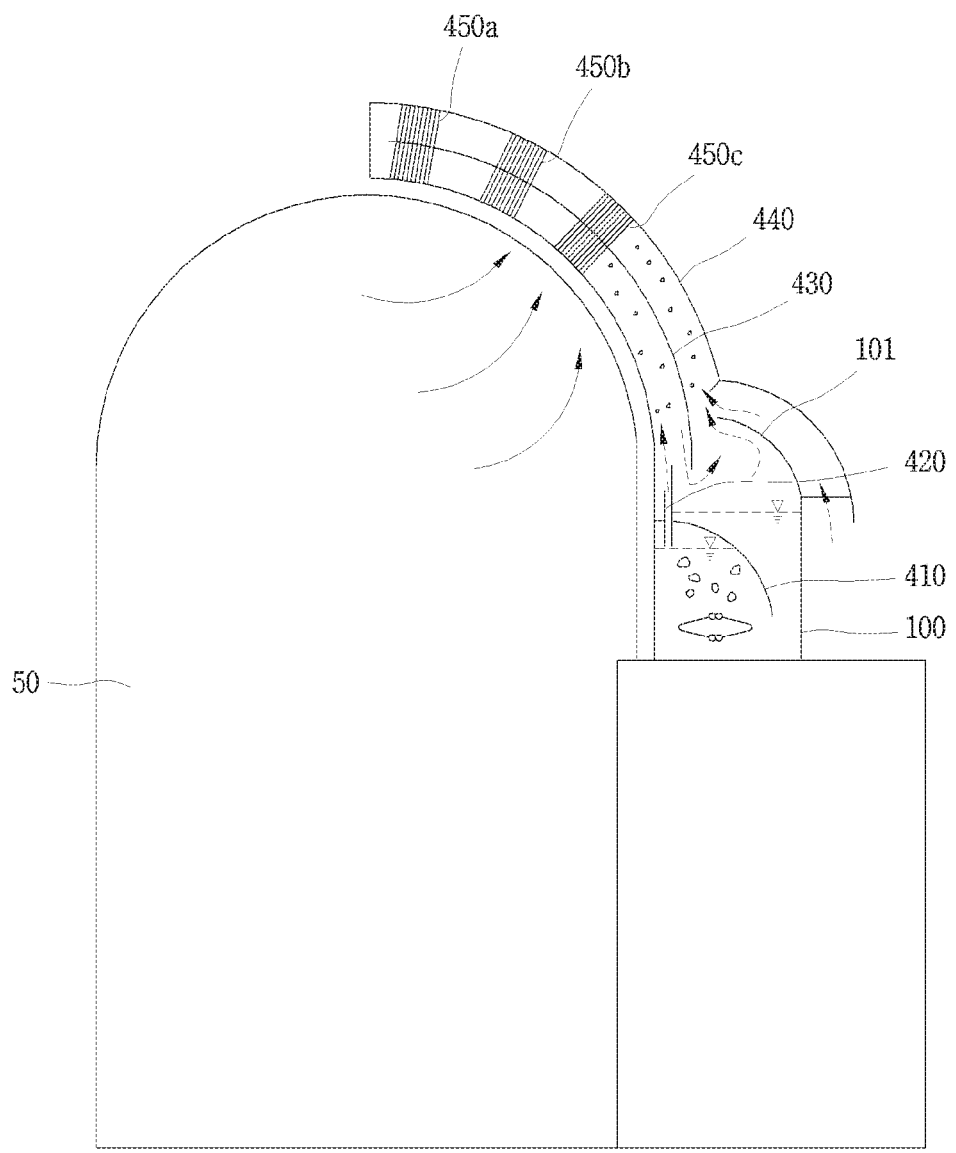

FIGS. 12A and 12B are views of a passive natural circulation cooling system in accordance with a third detailed embodiment. In the third detailed embodiment, the components other than a heat exchanger may be the same as or similar to those of the first detailed embodiment.

In the third detailed embodiment, a plurality of heat exchangers 450a, 450b, and 450c are installed within the duct 440. The plurality of heat exchangers 450a, 450b, and 450c may be spaced apart from each other by a predetermined distance.

In other words, in the third detailed embodiment, hot steam may be collected in an uppermost end of the duct 440 due to the buoyancy effect. A flow path of external air of a containment vessel is formed by arranging a bundle of heat exchangers, which are perpendicular to an air flow, in the uppermost end in a penetrating manner (staggered arrangement). However, the flow path of the external air is isolated from the flow paths inside the duct 440. The external air flows upward through the bundle of staggered heat exchangers, so as to cool air within the uppermost end. Convective heat transfer can be expected to increase due to a chimney effect.

A momentum due to the steam continuously generated in the passive condensation tank 100 can accelerate the steam leakage (outflow). Therefore, the heat exchangers can be arranged in multiple steps within the inner flow path to increase pressure drop, so as to minimize the steam leakage and simultaneously function as a heat exchanger so as to increase the heat transfer time and enhance the heat transfer performance.

The aforementioned passive natural circulation cooling system and method are not limited to the configuration and the method of the embodiments described above, but the embodiments may be configured such that all or some of the embodiments are selectively combined so that various modifications can be made.

INDUSTRIAL APPLICABILITY

The present invention can be used in a field of cooling systems provided in passive condensation tanks.

The invention claimed is:
1. A passive natural circulation cooling system configured for use with a nuclear reactor, comprising:
a passive condensation tank connected between a main steam line and a feedwater line of a steam generator and configured to accommodate cooling water therein; and
a condensation heat exchanger provided in the passive condensation tank to be in contact with the cooling water, and configured to transfer heat transferred from the steam generator to the cooling water; and
a condensate water recirculation device provided in or above the passive condensation tank and configured to condense the cooling water so that the cooling water circulates inside the passive condensation tank,
wherein the condensate water recirculation device comprises:
a duct extending upward from an upper portion of the passive condensation tank; and
a first separator extending downward from one side of an inner wall of the passive condensation tank toward another side in an inclined manner, the first separator forming a portion with the another side of the inner wall to communicate a lower space and an upper space with each other,
wherein at least a part of the first separator is configured to be submerged in the cooling water, and
wherein the condensation heat exchanger is disposed in the lower space of the first separator.
2. The system of claim 1, wherein the plurality of separators further comprise:
at least one of second and third separators extending along a lengthwise direction of the duct to minimize a leakage of steam rising along the duct.
3. The system of claim 2, wherein the second and third separators are spaced apart from each other,
wherein the second separator extends upward from the first separator, and
wherein the third separator extends downward from an upper inner wall of the duct to generate a downward flow path of steam rising along the second separator.
4. The system of claim 2, wherein the first separator is provided with a steam collection guide pipe, and
wherein the steam collection guide pipe extends into a lower space of the first separator and an inner space of the duct partitioned by the second separator.
5. The system of claim 4, wherein an inserted length of the steam collection guide pipe into the lower space of the first separator is determined based on information related to a preset water level and pressure.
6. The system of claim 1, wherein the duct is provided therein with a heat exchanger to transfer heat of the cooling water inside the duct to external air.
7. The system of claim 1, wherein the duct is provided with an external air outlet formed on an upper side thereof, and wherein the external air outlet is provided therein with a condensate water collecting structure for further collecting condensate water.

8. The system of claim 1, further comprising a heat exchanger installed below the first separator to receive heat from the cooling water within the lower space of the first separator.

9. The system of claim 8, wherein the heat exchanger comprises:
- an inlet formed on the first separator to allow the cooling water in the upper space of the first separator to be introduced therethrough;
- an outlet formed on the first separator at a position spaced apart from the inlet to allow the cooling water introduced through the inlet to flow out therethrough; and
- a body portion connecting the inlet and the outlet on a rear surface of the first separator, and configured so that the introduced cooling water is evaporated by exchanging heat with the cooling water within the lower space of the first separator while passing through the body portion.

10. The system of claim 9, wherein the outlet is located higher than the inlet above the first separator.

11. The system of claim 9, wherein the body portion is formed to be inclined upward from the inlet to the outlet.

12. The system of claim 9, wherein the body portion comprises a plurality of tubes formed in a bundle to increase a heat exchange area.

13. The system of claim 12, wherein the inlet and the outlet are provided in plurality, respectively, and
wherein the body portion comprises:
- a plurality of first pipes each having one side connected to each of the plurality of inlets and another side extending downward;
- a plurality of second pipes each having one side connected to the another side of each of the plurality of first pipes, and another side formed in an inclined direction; and
- a plurality of third pipes each having one side connected to the another side of each of the plurality of second pipes, and another side extending upward to be connected to each of the plurality of outlets.

14. The system of claim 13, wherein the body portion further comprises:
- a first connection portion connecting the plurality of first pipes and the plurality of second pipes so that the cooling water introduced from each of the plurality of first pipes is joined and then dispersed again into the plurality of second pipes; and
- a second connection portion connecting the plurality of second pipes and the plurality of third pipes so that the cooling water introduced from each of the plurality of second pipes is joined and then dispersed again into the plurality of third pipes.

15. The system of claim 8, wherein the condensation heat exchanger is provided in plurality, and
wherein heights of the inlet and the outlet of each of the condensation heat exchangers are sequentially reduced on the first separator.

16. The system of claim 8, wherein the condensate water recirculation device further comprises:
- a second separator located above the first separator with being spaced apart from the first separator, to condense steam evaporated from the cooling water in the upper space of the first separator and steam generated in the heat exchanger.

17. The system of claim 16, wherein the second separator extends downward from one side of the passive condensation tank toward another side in an inclined manner.

18. The system of claim 17, wherein the second separator is provided with a plurality of protrusions formed on one surface thereof in a protruding manner to increase heat exchange efficiency.

19. The system of claim 1, wherein a plurality of partitions are formed on an inner wall of the duct to induce condensation of steam contained in air rising along the duct and to prevent a leakage of steam.

20. The system of claim 1, wherein an outer wall of the duct is coated with a material having a white-based color so as to suppress a temperature rise inside the duct.

* * * * *